United States Patent Office 3,649,551
Patented Mar. 14, 1972

3,649,551
GLASSY ACETATE MATERIAL
Roger F. Bartholomew, Corning, N.Y., assignor to
Corning Glass Works, Corning, N.Y.
No Drawing. Continuation-in-part of application Ser. No. 773,319, Nov. 4, 1968. This application Sept. 8, 1970, Ser. No. 70,592
Int. Cl. C03c *3/30;* C07c *53/08;* C09k *1/02*
U.S. Cl. 252—301.2 R
8 Claims

ABSTRACT OF THE DISCLOSURE

This invention relates to the production of anhydrous glassy materials through the fusion of certain monovalent and divalent metal acetates alone or the fusion together of combinations of various monovalent and divalent metal acetates.

---

This application is a continuation-in-part of my pending application, Ser. No. 773,319, filed Nov. 4, 1968, now abandoned.

Glass has been commonly defined by the ceramist as an inorganic product of fusion which has cooled to a rigid nonequilibrium condition without crystallizing. However, in more general parlance, glasses have been characterized as noncrystalline solids, including both inorganic and organic materials, which, irrespective of the manner of preparation, can be considered as glasses where there is an absence of long range order in their atomic structure. The conventional inorganic glass materials, such as the silicate-based glasses, cannot be utilized as solvents for organic compounds inasmuch as the melting temperatures for these glasses are so high that the organic compound are normally completely vaporized. Furthermore, most commercially produced glasses require melting temperatures in excess of 1000° C. for times of at least several hours, necessitating special melting tanks, furnaces, and high power inputs.

In accordance with the present invention, I have discovered certain novel glassy acetate materials which can be produced through fusion at temperatures below 500° C. and, more practically, below about 400° C. These glassy materials are manufactured from ingredients having both an inorganic portion, e.g., an alkali metal or an alkaline earth metal, and an organic portion, viz., the acetate. In one embodiment of the invention, the product consists essentially entirely of lithium acetate, lead acetate, or zinc acetate and mixtures thereof. In a second embodiment of the invention, the glassy material consists essentially of 10–90 mole percent $MC_2H_3O_2$, wherein M consists of at least one monovalent metal selected from the group consisting of ammonium, sodium, and potassium, and 10–90 mole percent $LiC_2H_3O_2$. In a third embodiment of the invention, the product consists essentially of 10–96 mole percent $MC_2H_3O_2$, wherein M consists of at least one monovalent metal selected from the group consisting of ammonium, lithium, sodium, and potassium, and 4–90% $M''C_2H_3O_2$, wherein $M''$ consists of at least one divalent metal selected from the group consisting of magnesium, calcium, strontium, barium, cadmium, zinc, and lead.

The occurrence of glass formation can take place at the concentrations of ingredients set forth above subject, however, to limitations arising from the liquidus temperatures of the various mixtures. Hence, if the liquidus temperature is above about 375°–400° C. decomposition of the acetate becomes extensive and a water white clear glass cannot be secured. Nevertheless, the range of useful compositions and the ease of glass formation are considerably greater than the corresponding nitrate glasses which have previously been described in the literature.

The phase diagrams for many of the binary acetate mixtures recited above have been worked out in the literature. Nevertheless, phase diagrams reflect equilibrium conditions only. Thus, a liquidus line on a phase diagram represents the thermodynamic equilibrium state existing between the *liquid* and the *crystalline phase* derived from the original melt. Weyl and Marboe, "The Constitution of Glasses, a Dynamic Interpretation," vol. II, part 2, pp. 1284–1286, Interscience Publishers, 1967, point out that the liquidus temperature of a glass-forming system is of importance solely because it delineates the minimum temperature at which a melt can be maintained indefinitely without devitrification occurring therein. As proof that phase diagrams are useful only in equilibrium conditions and glasses are, by defintion, nonequilibrium systems, they cite the fact that most of the physical and chemical properties of conventional soda lime glasses are altered only very slightly when $Na_2O$ in such glasses is replaced with $K_2O$, but the phase diagrams of the $Na_2O$-CaO-$SiO_2$ and $K_2O$-CaO-$SiO_2$ systems bear essentially no resemblance of each other. Therefore, in the development of the phase diagrams for binary mixtures of metal acetates, the mixtures were surely melted but were not solidified to glasses.

Thus, the present invention requires that the melts be cooled to below the strain points thereof by quenching at rates in excess of about 100° C./minute, and, more preferably, at rates approximating 1000° C.–10,000° C./minute. To illustrate this need for rapid quenching to provide for glass formation from acetate melts, as well as to demonstrate the fallibility of predicting glass formation from a study of phase diagrams, the following examples are provided.

EXAMPLE I 8.2 grams $NaC_2H_3O_2$ and 9.8 grams $KC_2H_3O_2$ were fused together in a Vycor® brand beaker. The temperature of the melt was carefully controlled so that it remained about 10° C. above the melting point of the mixture. After maintaining the melt at temperature for approximately 10 minutes to eliminate any adsorbed water, a portion of the melt was rapidly quenched. This was accomplished by pouring about 5 grams of the melt into a circular stainless steel disc (4" radius by 1" thick) and instantaneously placing a 4" x 2" x 2" stainless steel block atop the liquid. This caused the melt to immediately solidfy to a white, crystalline, opaque mass.

The remainder of the melt was allowed to cool to room temprature within the beaker, this cooling rate estimated to be about 10° C. per minute. Again a white, crystalline, opaque mass was obtained, similar in appearance to that resulting from the rapid quenching of the same melt.

EXAMPLE II

A mixture of 10.2 grams $LiC_2H_3O_2$ and 8.2 grams $NaC_2H_3O_2$ was fused in a Vycor® brand beaker. The temperature of the melt was held between about 10°–20° C. above the melting point of the mixture until cessation of bubbling indicated the complete vaporization of water from the melt. A 5 gram sample of the melt was rapidly quenched to room temperature in accordance with the method employed in Example I and a water-white, transparent glass mass was obtained.

The remainder of the melt was allowed to cool to room temperature within the beaker, similarly to the practice recited in Example I. A white, crystalline, opaque mass resulted.

The phase diagrams of the two binary systems $NaC_2H_3O_2$-$KC_2H_3O_2$ and $LiC_2H_3O_2$-$NaC_2H_3O_2$ are quite similar. Yet, the first system cannot be quenched to form a glass whereas the second can. This is further illustration of the proposition that phase diagrams should not be implicitly relied upon to predict glass formation.

The acetate glasses of this invention have demonstrated exceptional utility as solvents for organic compounds. An equimolar calcium-potassium-sodium acetate glass has been made containing 15 mole percent EDTA. In addition, each of the acetate glasses can dissolve about 10–25 mole percent of acetate acid and retain the glassy structure. When the melt is held at a temperature of about 50° C. above the melting point thereof for about 5–10 minutes, thermal decomposition will take place accompanied with the production of fine particles of carbon, resulting in the glass so formed exhibiting a brown coloration. Therefore, the melting temperature for the glasses was normally maintained at a temperature less than 50° C. above the melting point thereof. All of the acetate glasses produced demonstrated a blue fluoroescence when irradiated with high intensity ultra-violet radiation except for lead-containing glasses which fluoresced a green color. When the carbon content due to thermal decomposition of the melt becomes great enough to color the glass a black-brown, fluorescence under ultra-violet radiation is substantially enhanced. A green phosphorescence is produced which takes on a pinkish-orange hue with very high carbon contents.

The D.C. resistivity of these acetate glasses is approximately $10^{12}$ ohm-cm. at room temperature. The resistivity of an equimolar composition of $$Ca(C_2H_3O_2)_2 + NaC_2H_3O_2 + KC_2H_3O_2$$

obeyed an Arrhenius-type behavior between 23°–73° C. ($\rho = \rho_0 \exp \Delta E/RT$) with $\Delta E = 19.4$ kcal./mole and

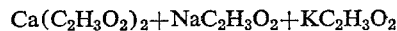

$$\rho_0 = 3.4 \times 10^{-2}$$

ohm-cm. These values are similar to those exhibited by commercial soda lime glasses.

The glass transition temperatures ($T_g$) of a series of acetate glasses were measured by D.T.A. techniques. Table I records these determinations wherein the glass compositions are reported in mole percent:

TABLE I

| Ca(C₂H₃O₂)₂, percent | KC₂H₃O₂, percent | NaC₂H₃O₂, percent | LiC₂H₃O₂, percent | $T_g$, ° C. |
|---|---|---|---|---|
| 33½ | | 66⅔ | | 110 |
| 50 | 20 | 30 | | 115 |
| 50 | 30 | 20 | | 100 |
| 50 | 40 | 10 | | 100 |
| 33½ | 66⅔ | | | 87 |
| | | 50 | 50 | 60 |
| | | 43 | 57 | 62 |
| | | | 100 | 121 |

This table also indicated that the annealing and strain points, as well as the $T_g$ of these glasses, are several hundred degrees centigrade below those exhibited by commercial soda lime glasses.

Applications for these glassy materials include such uses as: (1) a water soluble glass; (2) a photochromic glass wherein an inorganic silver halide or an organic photochromic compound such as 2-(2′,4′-dinotrobenzyl)-pyridine is dissolved in the glass matrix; (3) an electric device; (4) a material which fluoresces blue upon exposure to ultra-violet radiation; and (5) a glass host lattice for non-reactive organic compounds. These glasses can be formed into all such conventional shapes as rods, discs, bars, and tubes.

The following examples are further illustrative of the parameters of my invention.

EXAMPLE III

A mixture of 19.6 grams (0.2 mole) $KC_2H_3O_2$ and 8.2 grams (0.1 mole) $Ca(C_2H_3O_2)_2$ was placed in a Pyrex® brand beaker and then fired therein at a temperature of about 10°–20° C. above the melting point of the mixture (250° C.) for a sufficient period of time that bubbling resulting from the vaporization of water ceased. Thereafter, the melt was quenched on a steel plate in accordance with the method outlined in Example I to produce a water-white, transparent, glass disc exhibiting the following characteristics:

(a) a density of 1.527 g./cm.³ at 25° C.;
(b) a refractive index of 1.455 at 25° C.;
(c) a glass transition temperature of 87° C.;
(d) a glass which fluoresces blue under ultra-violet radiation;
(e) a glass which is very soluble in water and slightly soluble in methanol;
(f) a melt which can dissolve up to 25 mole percent of acetic acid and still form a glass upon quenching; and
(g) a melt which can dissolve up to 15 mole percent EDTA and still form a glass upon quenching.

To protect the glass disc from attack by water from the ambient atmosphere, it was coated with an acrylic lacquer.

Utilizing the procedure recited for Example III, other water-white, transparent acetate glasses were prepared from the compositions reported in Table II below in mole percent:

TABLE II

| | IV | V | VI | VII | VIII | IX | X |
|---|---|---|---|---|---|---|---|
| LiC₂H₃O₂ | 50 | 50 | 60 | 67 | 20 | | |
| NaC₂H₃O₂ | | | 40 | 33 | 80 | 67 | |
| KC₂H₃O₂ | | 50 | | | | | 50 |
| Ca(C₂H₃O₂)₂ | | | | | | 33 | 50 |
| NH₄C₂H₃O₂ | | 50 | | | | | |

| | XI | XII | XIII | XIV | XV | XVI | XVII | XVIII |
|---|---|---|---|---|---|---|---|---|
| NaC₂H₃O₂ | | | 50 | 33 | 33 | 35 | 48 | 47 |
| KC₂H₃O₂ | | 50 | | 33 | 33 | 35 | 48 | 47 |
| NH₄C₂H₃O₂ | 50 | | | | | | | |
| Ca(C₂H₃O₂)₂ | | | | 34 | | | | |
| Sr(C₂H₃O₂)₂ | | | | | 34 | | | |
| Ba(C₂H₃O₂)₂ | | | | | | 30 | 4 | |
| Cd(C₂H₃O₂)₂ | 50 | 50 | 50 | | | | | |
| Mg(C₂H₃O₂)₂ | | | | | | | | 6 |

| | XIX | XX | XXI | XXII | XXIII | XXIV | XXV | XXVI | XXVII | XXVIII |
|---|---|---|---|---|---|---|---|---|---|---|
| LiC₂H₃O₂ | | | | | 50 | | 40 | | | 30 |
| NaC₂H₃O₂ | 47 | 40 | 10 | 50 | | | | | | |
| KC₂H₃O₂ | 47 | 10 | 40 | | | 71 | | 50 | | |
| Ca(C₂H₃O₂)₂ | | 50 | 50 | | | | | | | |
| Sr(C₂H₃O₂)₂ | 6 | | | | | | | | | |
| Pb(C₂H₃O₂)₂ | | | | 50 | 50 | 29 | | | 80 | 10 |
| Zn(C₂H₃O₂)₂ | | | | | | | 60 | 50 | 20 | 60 |

It is apparent to those skilled in the art that many varations and modifications of the invention as set forth hereinabove can be practiced without departing from the spirit and scope of the invention. The invention is not limited to those details and applications described, except as set forth in the appended claims.

I claim:

1. A material selected from the following groups wherein the compositions thereof consist essentially of (Group A) $LiC_2H_3O_2$, $Pb(C_2H_3O_2)_2$, or $Zn(C_2H_3O_2)_2$, and mixtures thereof;

(Group B) 10–90 mole percent of $NH_4C_2H_3O_2$, $NaC_2H_3O_2$, and/or $KC_2H_3O_2$ and 10–90 mole percent of $LiC_2H_3O_2$; or (Group C) 10–96 mole percent of $NH_4C_2H_3O_2$, $LiC_2H_3O_2$, $NaC_2H_3O_2$, and/or $KC_2H_3O_2$ and 4–90 mole percent of $Mg(C_2H_3O_2)_2$, $Ca(C_2H_3O_2)_2$, $$Sr(C_2H_3O_2)_2, Ba(C_2H_3O_2)_2, Cd(C_2H_3O_2)_2$$

$Zn(C_2H_3O_2)_2$, and/or $Pb(C_2H_3O_2)_2$ said material being in the form of a glass.

2. A glassy material according to claim 1 consisting essentially of $LiC_2H_3O_2$ and $KC_2H_3O_2$.

3. A glassy material according to claim 1 consisting essentially of $LiC_2H_3O_2$ and $NaC_2H_3O_2$.

4. A glassy material according to claim 1 consisting essentially of $LiC_2H_3O_2$ and $NH_4C_2H_3O_2$.

5. A glassy material according to claim 1 consisting essentially of $NaC_2H_3O_2$, $KC_2H_3O_2$, and $Ca(C_2H_3O_2)_2$.

6. A glassy material according to claim 1 consisting essentially of $NaC_2H_3O_2$, $KC_2H_3O_2$, and $Sr(C_2H_3O_2)_2$.

7. A method for making a glassy material selected from the following groups wherein the compositions thereof consist essentially of (Group A) $LiC_2H_3O_2$, $Pb(C_2H_3O_2)_2$, or $Zn(C_2H_3O_2)_2$, and mixtures thereof;

(Group B) 10–90 mole percent of $NH_4C_2H_3O_2$, $NaC_2H_3O_2$, and/or $KC_2H_3O_2$ and 10–90 mole percent of $LiC_2H_3O_2$; or (Group C) 10–96 mole percent of $NH_4C_2H_3O_2$, $LiC_2H_3O_2$, $NaC_2H_3O_2$, and/or $KC_2H_3O_2$ and 4–90 mole percent of $Mg(C_2H_3O_2)_2$, $Ca(C_2H_3O_2)_2$, $$Sr(C_2H_3O_2)_2, Ba(C_2H_3O_2)_2, Cd(C_2H_3O_2)_2,$$
$$Zn(C_2H_3O_2)_2, \text{ and/or } Pb(C_2H_3O_2)_2$$

which comprises melting a batch for said glassy material at a temperature less than 50° C. above the melting point thereof and thereafter quenching said melt to a temperature below the strain point thereof at a rate in excess of 100° C./minute.

8. A method according to claim 7 wherein said rate of quenching ranges between about 1000°–10,000° C./minute.

References Cited

Diogenov, Zhur Neorg. Khimie, vol. 1, No. 11, 1956, pp. 2551–2555.

Ilyasov, Chem. Abstracts, 1963, vol. 58, column 965.

Sokolov et al., Chem. Abstracts, 1968, vol. 68, abstract No. 24744.

JAMES E. POER, Primary Examiner

A. P. DEMERS, Assistant Examiner

U.S. Cl. X.R.

106—47 R; 252—301.3 R; 260—429.9, 435 R, 541